April 1, 1930.                    E. WALTER                    1,753,100
                          COMBINATION OUTLET BOX
                            Filed Feb. 6, 1926
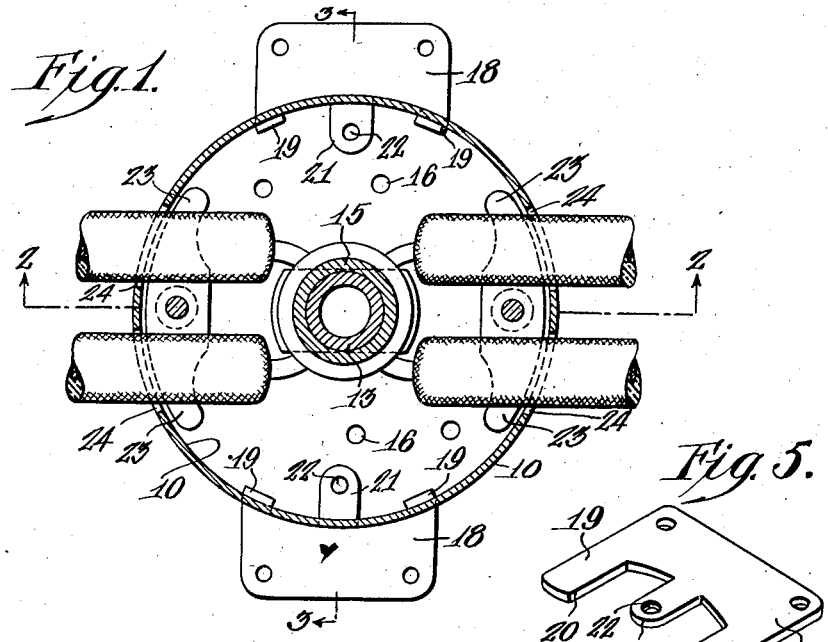
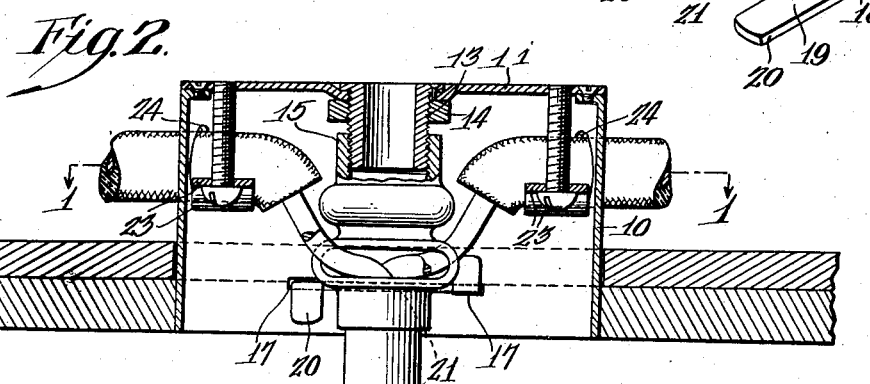
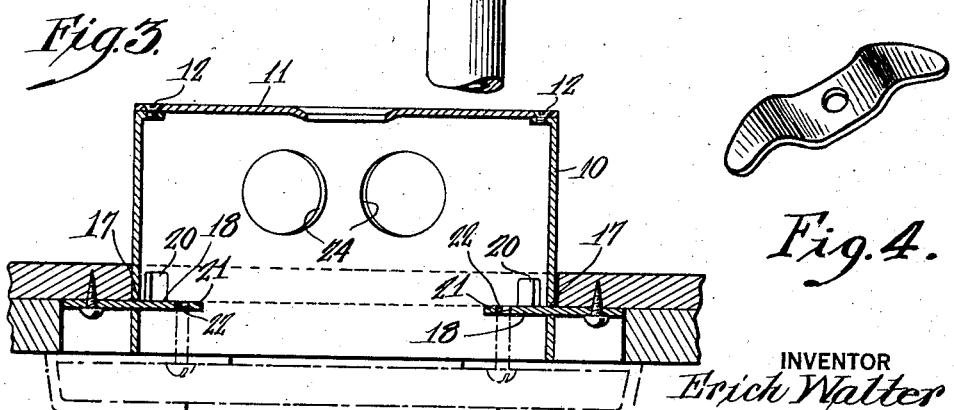
INVENTOR
*Erich Walter*
BY
*Victor J. Evans*
ATTORNEY Patented Apr. 1, 1930

1,753,100

UNITED STATES PATENT OFFICE

ERICH WALTER, OF ATLANTIC CITY, NEW JERSEY

COMBINATION OUTLET BOX

Application filed February 6, 1926. Serial No. 86,537.

This invention relates to outlet boxes, and more particularly to a combination outlet box and lighting fixture support which is adapted to be used as a bracket or ceiling outlet, and which can be used on either new or old installation work. The principal object of the invention is to provide a combination outlet box and lighting fixture support, which is particularly adapted to receive the inlet conduit wires in a direct parallel manner, thereby eliminating sharp bends or otherwise kinking the flexible conduit wires, and the depth of the box provides for splicing any of the wires.

Another object of the invention is to provide a combination outlet box and fixture support as specified, which is provided interiorly with a plurality of cleats for securing in pairs, the ends of the conduit cables which are entered into the outlet box through any two of the four pair of openings in the annular flange of the box, which are spaced 90° apart about the said annular flange.

A further object of the invention is to provide a combination outlet box and fixture support, which may be secured to the wooden lath, special braces, brackets, or any suitable metal support, and which also provides for attaching a lighting fixture directly in the outlet box for the purpose of avoiding the use of reducers, extensions, nipples, or other auxiliary connecting means.

Other objects of the invention will appear in the following detail description, and in the accompanying drawing, wherein:

Figure 1—is a plan view of the outlet box showing the interior thereof.

Figure 2—is a cross section through the outlet box on the line 2—2 of Figure 1, showing a fixture secured thereto and the box secured in a ceiling.

Figure 3—is a cross section through the outlet box per se on the line 3—3 of Figure 1.

Figure 4—is a detail view of one of the conduit cleats per se.

Figure 5—is a plan view of one of the attaching plates.

Referring more particularly to the drawing, the combination outlet box and fixture support comprises a cylindrical shell 10 with a concrete bottom plate 11 therefor which is spotwelded or otherwise secured over one open end of said shell 10, as indicated at 12. The bottom plate 11 is apertured centrally and provided therein with a flanged end threaded stud 13, which is rigidly secured in said plate 11 by means of a lock nut 14, which engages against the underface of the plate 11. Said stud 13 extends below said nut 14, for a distance sufficient for attaching a fixture stem 15 thereto. A plurality of apertures 16 are further provided in the bottom plate 11 surrounding the centrally fixed stud 13 for securing the cylindrical box formed by the shell 10, and bottom plate 11, by means of screws through said apertures 16, to a suitable bottom attaching surface. The cylindrical shell 10 is provided adjacent the outer free edge and on the center line at each side thereof with a plurality of rectangular slots, which are punched out in said shell 10 for receiving a substantially rectangular attaching and supporting plate 18 on each side thereof by means of a plurality of ears 19 formed on said plate 18, and which are inserted in said slot 17 and each end ear 20 turned over to secure said plate 18. The center ear 21 thereon which projects laterally into the shell 10 from each side thereof, is provided with a threaded aperture 22 for suspending a fixture canopy, usually associated with a lighting fixture. The outwardly and laterally extending portions of the plates 18 anchored in the shell 10, are each provided with a plurality of apertures for securing the outlet box in a suitable recess at points adjacent the outer periphery of the shell 10.

The outlet box thus formed, is further provided in the interior thereof with a plurality of cleats 23 which have their ends arcuately formed for clamping simultaneously a pair of conduit cables by means of an aperture centrally therein, and a screw therefor for securing said cleats on the inner surface of the plate 11, adjacent the inner side of the shell 10. The cleats 23 are positioned at two equally spaced points about the inside diameter of the shell 10, and are adapted to register with a plurality of conduit cable receiving openings 24 which are arranged in pairs and each pair positioned at four equally spaced points about the circumference of the shell 10, and adjacent the top edge of the bottom plate 11.

From the foregoing description, taken in connection with the accompanying drawing, it will be readily apparent to those skilled in the art, that I have provided a neat, compact, and highly efficient outlet box, and while I have shown and described one practical embodiment of my invention, I do not limit myself to the precise construction, as set forth, and consider myself at liberty to make such changes and modifications, as fairly fall within the claim hereunto appended.

What I claim is:

An outlet box comprising a body having a marginal wall provided at diametrical opposite portions with two remote slots and an intermediate slot, said marginal wall of the box adapted to be extended through a building wall to which the box is to be attached, plates secured in recesses of the building wall and positioned diametrically opposite each other, each of said plates having ears at its opposite ends and provided with a central ear intermediate the end ears, the central intermediate ear extending through the intermediate slot radially of the box and provided with means for attaching a suspending fixture canopy thereto, the end ears passing through the remote slots and being bent over in opposite directions to hold the box rigid in position in the building wall, while an edge of the plate between the ears engage with the outer surface of the wall of the box.

In testimony whereof I affix my signature.

ERICH WALTER.